United States Patent [19]

Dworak et al.

[11] 4,218,253
[45] Aug. 19, 1980

[54] SINTERED CERAMIC MATERIAL OF IMPROVED DUCTILITY

[75] Inventors: Ulf Dworak, Hohengehren; Hans Olapinski, Plochingen, both of Fed. Rep. of Germany

[73] Assignee: Feldmühle Aktiengesellschaft, Viersen, Fed. Rep. of Germany

[21] Appl. No.: 947,744

[22] Filed: Oct. 2, 1978

[30] Foreign Application Priority Data

Oct. 5, 1977 [DE] Fed. Rep. of Germany ....... 2744700

[51] Int. Cl.² ..................... C04B 35/48; C04B 35/10; C04B 35/56
[52] U.S. Cl. ........................ 106/43; 106/44; 106/73.3; 106/73.4; 106/73.5
[58] Field of Search ................ 106/43, 44, 73.4, 73.3, 106/73.5

[56] References Cited

U.S. PATENT DOCUMENTS

| | | | |
|---|---|---|---|
| 1,159,264 | 11/1915 | Pfaff | 106/44 |
| 2,465,672 | 3/1949 | Blaha | 106/44 |
| 2,908,553 | 10/1959 | Frank et al. | 106/44 |
| 3,285,018 | 11/1966 | Henderson et al. | 106/44 |
| 3,669,695 | 6/1972 | Iler et al. | 106/43 |
| 3,676,161 | 7/1972 | Yates | 106/73.4 |
| 3,725,094 | 4/1973 | Levy et al. | 106/73.4 |
| 3,776,744 | 12/1973 | Clendenen | 106/73.4 |
| 3,862,846 | 1/1975 | Smoak et al. | 106/73.4 |

FOREIGN PATENT DOCUMENTS 2549652  5/1977  Fed. Rep. of Germany ............. 106/65

*Primary Examiner*—O. R. Vertiz
*Assistant Examiner*—Mark Bell
*Attorney, Agent, or Firm*—Toren, McGeady and Stanger

[57] ABSTRACT

The ductility of sintered bodies of alumina and like hard substances can be improved without loss in mechanical strength by uniformly distributed individual particles of tetragonal zirconia or hafnia in amounts of 1%–50% by volume if the dispersed particles have an average size of 0.05 to 2 μm.

7 Claims, No Drawings

SINTERED CERAMIC MATERIAL OF IMPROVED DUCTILITY

BACKGROUND OF THE INVENTION

1. Field of the Invention

This invention relates to sintered bodies of alumina and like hard substances, and particularly to a sintered, hard material having improved ductility by virtue of a content of zirconia or hafnia.

2. Description of the Prior Art

It is known from the published German application 2 549 652 that the ductility of a sintered body of alumina can be improved by creating microfissures which permit some plastic deformation of the body prior to ultimate failure under applied stresses, particularly bending stresses. The microscopic fissures are generated by dispersing in the alumina, prior to sintering, agglomerates of zirconia, and sintering above the temperature at which the zirconia is converted to the tetragonal crystal form which is unstable or metastable at ordinary room temperature in the absence of stabilizing agents. The formation of microfissures in useful numbers requires the zirconia to be present in the sintering mixture and in the sintered product in the form of agglomerates having an average size of 2 to 15 μm, and in an amount of 8 to 25 percent by volume. An increase in zirconia content produces an increase in ductility up to an optimum value which depends on the size of the individual particles in the agglomerates. Regardless of the particle size, the flexural strength decreases with the amount of the agglomerates, that is, with the number and size of microfissures in the sintered matrix.

SUMMARY OF THE INVENTON

It has now been found that microfissures are not needed for improving the ductility of sintered alumina bodies by means of zirconia, and that a similar improvement of ductility can be had without the loss of flexural strength inherent in the known materials.

Individual particles of zirconia, uniformly distributed in a sintered matrix of alumina in an amount of one to fifty percent of the volume of the sintered body, can bring about the desired greater ductility at a flexural breaking strength greater than $500\pm50$ N/mm$^2$ if the zirconia particles have an average size of 0.05 to 2 μm, and are predominantly in the tetragonal crystal form.

DESCRIPTION OF THE PREFERRED EMBODIMENTS

Microfissures are effective in improving ductility because of the energy absorbed during growth and branching of the fissures under applied stresses. The mechanism by means of which individual, uniformly distributed zirconia particles absorb energy during stressing of the sintered body has not yet been fully elucidated. It is believed that the conversion of the metastable tetragonal zirconia to the monoclinic form absorbs energy and thereby reduces local stresses. This assumption finds support in the observed fact that tetragonal zirconium oxide in the surface of a sintered body of the invention is largely converted to the monoclinic modification by surface grinding which inherently causes stress. The conversion is readily measured by X-ray analysis.

Hafnium oxide is about as effective in improving ductility of sintered alumina bodies as zirconium oxide, and other sintered bodies prepared from very hard particles benefit from uniformly dispersed individual particles of zirconium and hafnium oxide in the same manner as aluminum oxide. The carbides of silicon, titanium, niobium, and tungsten, and the nitrides of silicon and titanium are illustrative of other hard materials whose particles are commonly converted to strong, but brittle bodies by conventional sintering. The ductility of such bodies is improved by individually dispersed particles of tetragonal zirconia and hafnia meeting the above size limitations. Generally best results are achieved when the sintered bodies, in addition to the matrix of alumina and its afore-mentioned equivalents, contain 2.5 to 20 percent by volume of zirconium or hafnium oxide in the tetragonal crystal form. An average particle size of 0.1 to 1.5 μm is most advantageous.

The procedures employed in making the sintered material of this invention are conventional in themselves. The matrix may include adjuvants other than the non-metallic hard particles. The use of magnesium oxide for controlling grain growth in aluminim oxide during sintering is well known, and the matrix preferably contains 0.05% to 0.25% MgO if it otherwise consists of aluminum oxide of high purity. The improvement brought about by admixtures of tetragonal zirconia are particularly advantageous in the very dense and strong bodies of sintered alumina in which the average particle size is between 0.5 and 5μ.

It is essential to the proper distribution of the zirconia and hafnia in the matrix forming materials that the powdered raw materials be mixed intimately until the zirconia or hafnia is uniformly dispersed in the principal component, and that the formation of aggregates be avoided. Wet grinding in a ball mill can be controlled in a conventional manner to produce the desired mixture. The sintering conditions for aluminum oxide, in particular, are such that there is no significant grain growth in zirconia so that the average particle size of the zirconium oxide prior to mixing with the matrix forming material should be the same as is desired in the finished product, that is, preferably 0.1 to 1.5 μm. Conventional methods are employed during sintering. Firing of green compacts at atmospheric pressure, hot pressing, and isostatic hot pressing may be resorted to as usual. Usual sintering conditions are maintained to produce as dense a material as is possible if highest mechanical strength is desired.

Hafnia is converted to the tetragonal modification at a higher temperature than zirconia and hafnia-modified sintered bodies are preferred as materials of construction for high temperature service.

The following Examples are further illustrative of this invention.

EXAMPLE 1

940 g Aluminum oxide powder of a commercial, magnesia containing grade suitable for the production of high-density, sintered alumina bodies and having an average particle size of 5μm was mixed wet with 60 g monoclinic zirconium oxide powder having an average particle size of 1μ until the individual zirconia particles were uniformly distributed in the larger volume of alumina particles. The mixture then was dried and granulated.

The granules were compacted on an isostatic press at a specific pressure of 1500 kp/cm$^2$. The green compact was fired at 1600° C. for one hour in a gas-fired furnace. Test bars 4.5×7×55 mm were cut from the sintered body so obtained by means of a diamond saw and lapped with diamond powder.

The bars were tested for flexural breaking strength ($\sigma_B$) in a standard bending test with four-point loading. The ductility limit (KIc) was determined in notched test bars also by four-point loading. A flexural strength of $\sigma_B = 550 \pm 50$ N/mm$^2$ and a ductility limit of KIc = $195 \pm 15$ N/mm$^{3/2}$ was found.

EXAMPLE 2

500 g Aluminum oxide powder of the above grade having an average particle size of 2 μm, 150 g titanium nitride powder of 1 μm average particle size, 150 g titanium carbide powder of 1 μm average particle size, and 200 g monoclinic zirconium oxide powder having an average particle size of 1 μm were mixed wet until the zirconia particles were uniformly and individually distributed among the particles of harder material. The mixture was dried and granulated, and the granules were pressed in graphite molds at 400 kg/cm$^2$ and 1750° C. for three minutes.

Test bars were prepared from the shaped, sintered bodies so obtained, and tested as described in Example 1. The material showed a flexural strength of $\sigma_B = 750 \pm 70$ N/mm$^2$ and a ductility limit KIc = $300 \pm 25$ N/mm$^{3/2}$.

EXAMPLE 3

800 g Silicon carbide powder of average particle size 1 μm and 200 g monoclinic zirconium oxide powder of average particle size 1 μm were mixed wet until the individual zirconia particles were uniformly distributed in the silicon carbide. The mixture was dried and granulated, and the granules were sintered by hot pressing in graphite molds at 380 kp/cm$^2$ at 1820° C. for six minutes.

Test bars prepared from the sintered bodies in the manner of Example 1 yielded values of $\sigma_B = 710 \pm 75$ N/mm$^2$ and KIc = $290 \pm 30$ N/mm$^{3/2}$.

Closely analogous results were achieved when the zirconia in the preceding Examples was replaced by hafnia, and when niobium carbide, tungsten carbide, or silicon nitride were substituted in part or entirely for the other matrix forming materials referred to in the Examples.

It should be understood, therefore, that the foregoing disclosure relates only to presently preferred embodiments and that it is intended to cover all changes and modifications of the examples of the invention chosen herein for the purpose of the disclosure which do not depart from the spirit and scope of the invention set forth in the appended claims.

What is claimed is:

1. A densely sintered material consisting essentially of a matrix and individual particles of at least one oxide of the group consisting of zirconium oxide and hafnium oxide, said individual particles being uniformly distributed in said matrix and being present in said material in an amount of one to fifty percent by volume, said oxide being predominantly in the tetragonal crystal form, and the average size of said individual particles being between 0.05 and 2 μm, said matrix consisting essentially of at least one member of the group consisting of silicon carbide, titanium carbide, niobium carbide, tungsten carbide, silicon nitride, titanium nitride, and aluminum oxide.

2. A material as set forth in claim 1, wherein said at least one member is aluminum oxide.

3. A material as set forth in claim 2, wherein said aluminum oxide contains 0.05% to 0.25% by weight magnesium oxide as a grain growth controlling agent.

4. A material as set forth in claim 2, wherein said material contains 2.5 to 20 percent by volume of said oxide in said tetragonal crystal form.

5. A material as set forth in claim 1 having a flexural breaking strength greater than $500 \pm 50$ N/mm$^2$.

6. A material as set forth in claim 1, wherein the average size of said individual particles is between 0.1 and 1.5 μm.

7. A material as set forth in claim 1, which is substantially free from microfissures.

* * * * *

UNITED STATES PATENT AND TRADEMARK OFFICE
CERTIFICATE OF CORRECTION

PATENT NO.  :   4,218,253
DATED       :   August 19, 1980
INVENTOR(S) :   Ulf Dworak et al.

It is certified that error appears in the above—identified patent and that said Letters Patent is hereby corrected as shown below:

In the heading of the patent [73] should read:

[73] Assignee:
-- Feldmuehle Aktiengesellschaft, of Duesseldorf Germany --.

Signed and Sealed this

Thirtieth Day of December 1980

[SEAL]

*Attest:*

SIDNEY A. DIAMOND

*Attesting Officer*   *Commissioner of Patents and Trademarks*